Figure 1:
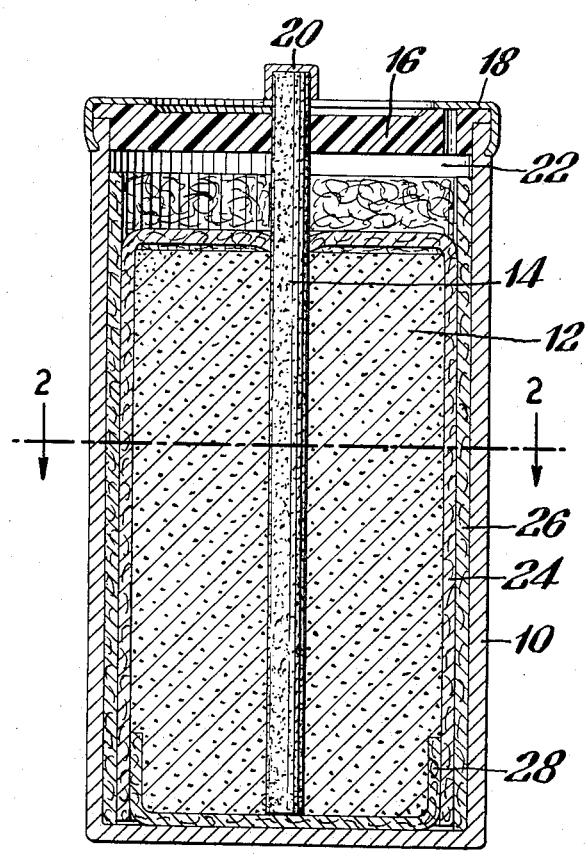

United States Patent [19]
Urry

[11] 3,802,921
[45] Apr. 9, 1974

[54] SEPARATOR FOR PRIMARY GALVANIC CELLS

[75] Inventor: Lewis F. Urry, North Olmsted, Ohio

[73] Assignee: Union Carbide Corporation, New York, N.Y.

[22] Filed: Mar. 28, 1972

[21] Appl. No.: 238,921

[52] U.S. Cl............. 136/100 M, 136/131, 136/145
[51] Int. Cl............................................. H01m 3/00
[58] Field of Search.......... 136/100 R, 100 M, 107, 136/123, 125, 128, 130, 131, 145, 133

[56] References Cited
UNITED STATES PATENTS
| | | | |
|---|---|---|---|
| 1,640,488 | 8/1927 | Deibel et al. | 136/131 |
| 1,654,038 | 12/1927 | Deibel | 136/131 |
| 615,292 | 12/1898 | Maas | 136/123 |
| 3,089,914 | 5/1963 | Carmichael et al. | 136/131 |
| 3,494,801 | 2/1970 | Urry | 136/133 |
| 3,048,645 | 8/1962 | Ruben | 136/100 M |

Primary Examiner—Donald L. Walton
Attorney, Agent, or Firm—Robert C. Cummings

[57] ABSTRACT

A separator for primary galvanic cells particularly of the type in which the depolarizer-cathode mix has a high moisture content comprises two plies of paper. One ply is adjacent to and in contact with the depolarizer-cathode and is folded over that portion, thereof defining one boundary of a free space in the cell. A second ply is in contact with the anode of the cell and extends into the free space. The anode contacting ply is of paper more bibulous than the cathode contacting ply.

7 Claims, 2 Drawing Figures

SEPARATOR FOR PRIMARY GALVANIC CELLS

This invention relates to primary galvanic cells, particularly of the type having a relatively large quantity of electrolyte, and is more specifically directed to an improved separator for such cells.

Although the most widely used primary galvanic cells are commonly referred to as "dry cells", of course they are not dry since they employ an aqueous electrolyte. However, the electrolyte is immobilized in the cell, being absorbed within the depolarizer-mix, which is the cell cathode, and within the separator interposed between the cathode and the anode of the cell. The separator in addition to retaining some of the cell electrolyte serves the function of providing physical separation between anode and cathode to prevent short circuiting of the cell.

By far the most widely used primary galvanic cell system is the Leclanché in which the consumable anode is zinc, the depolarizer-cathode is manganese dioxide, and the electrolyte is an aqueous solution of zinc chloride and ammonium chloride. Separators for this system have engaged the attention of the industry for many years, and the suggestions for separators have run the gamut from sawdust to sophisticated films. Generally the most successful separators, and those most widely used in this system today, include a highgrade paper with a starch or gel coating on one or both sides, the separator being placed in the cell with the starch or gel adjacent to and in contact with the zinc anode.

Although as indicated the Leclanché type dry cell has enjoyed great success, recently increased attention is being paid to other systems or modifications of the system to provide characteristics not obtainable in the Leclanché system. For example considerable effort has been made to substitute for the zinc anode an anode of magnesium. The magnesium anode offers the prospect of higher voltage than can be obtained with a zinc anode. Even more recently, the substitution of aqueous zinc chloride solution for the mixed ammonium chloride and zinc chloride solution used as electrolyte in the Leclanché system has come under intensified investigation. Both the magnesium cell and the zinc chloride cell employ a larger quantity of aqueous electrolyte (than is required in the conventional Leclanché cell) because in both, cell reactions consume water and service may be limited by insufficient water content.

Commercial conventional Leclanché cylindrical cells are of two main types. In the "pasted" cell the wet cathode depolarizer mix is impact or pressure molded to give a cylindrical "bobbin" or "dolly" containing a central carbon collector rod or "pencil". This bobbin is later inserted into a cylindrical zinc anode container "can" or "cup" together with a flowable separator paste or colloidal mass which is cooked or otherwise gelled to give an immobilized separator member between the zinc can and the mix bobbin. Relatively dry mixes give the best bobbins, so in this construction a substantial amount of the total cell electrolyte is added by way of the separator paste.

In the "lined" cell the separator is applied to the inside wall of the zinc can either as an adherent film or coating or as an inserted layer of coated paper, for example. The wet cathode mix is extruded or rammed into position to fill a major portion of the lined can, and the central carbon collector rod is then inserted directly into the rammed mix or into a hole made by a piercing rod. In this construction virtually all of the cell electrolyte is added by way of the wet mix, which is therefore much wetter than that used to mold bobbins. Both the placement under pressure of wet mix in the container and the insertion of the cathode collector rod present problems in smearing contamination of the inside of the container anode with mix and possible rupturing or penetrating by mix fines of the separator liner previously placed in the cell container.

For various reasons zinc chloride and magnesium cylindrical cells are preferably made as lined cells on equipment of the same type used to make lined Leclanché cells. Whereas the wettest Leclanché mixes run about 20 percent water maximum by weight, the zinc chloride and magnesium cell mixes may run as high as 28–35 percent water by weight. The mix contamination problem is accentuated in the latter mixes because of the higher water content. In the manufacture of a magnesium cell, for example, a sheet of paper is placed into a magnesium tube or cup to line its internal walls. Wet mix is then injected into the container, and the collector rod is driven into the mix. A continuing quality problem is experienced with such cells. No matter how or where the mix or mix particles come into direct contact with the magnesium wall, the disadvantages accruing therefrom are serious. Thus internal short circuits may occur or perforation corrosion of the magnesium wall may take place. Both of these phenomena have been observed when a single sheet of plain paper has been used as separator between the magnesium wall and the mix. The use of a gel or starch coated paper or of films (for example methylcellulose) in magnesium cells has introduced other problems due primarily to lowered diffusion rate of reaction products in the cell without solving the contamination problem. In the zinc chloride cell system, where gel coated paper is generally preferred over plain paper, the mix contamination problem also exists. Actually it has been found that in all three cell systems in which lined cells are assembled from wet mix by extrusion or compression into a lined can contamination is a problem, being worst with the magnesium system and least with Leclanché.

Study of the problem has shown that mix contamination of the anode occurs in a variety of ways and has several causes. Considerable pressure is exerted on and by the mix during mix injection, mix piercing, and collector rod insertion. Some free electrolyte, carrying mix fines, is expressed from a portion of the mix (especially the bottom) during these pressure steps. The free electrolyte flows into the paper separator and may also tend to flow outward past the separator overlap and upward into the free space above the mix. The paper is subject to possible stretching or tearing under pressure, especially when wet. Mix particles may thus penetrate past the fibers even when the original dry paper appears free of thin spots or pin holes.

A grosser form of mix contamination can occur in the upper portion of the cell during mix injection, mix piercing, and electrode insertion. During mix insertion excess mix tends to flow up past the insertion nozzle and this can smear on the inside of the can when the nozzle is withdrawn. The mix piercing rod is usually rotated and this can throw mix out against the can wall. All of these operations including electrode insertion can produce loose particles or chunks of mix on the top surface of the compressed mix, which may later fall against the anode wall and stick there as the cell is handled.

In addition to the mechanical demands placed on the separator, it must also freely imbibe and retain electrolyte in position against the anode in order to insure full utilization of the anode surface and to maintain a low electrolytic resistance to current flow through the separator. Mechanical considerations call for a thick, strong, dense, slow-wetting, high wet-strength separator paper, whereas electrochemical considerations require a thin, soft, open structure, highly bibulous and absorbent separator paper.

Standard commercial practice with magnesium cells for example has been to use a compromise paper, such as a "tube-winding" kraft paper. It has been found, however, that no one grade of paper in any thickness can give complete protection against mix penetration without incurring reduced amperage, increased "delay", and reduced service. In addition, the practice of extending the single separator liner up into the free space, but short of the seal area at the top, still permits fine particle penetration of the overlap in the free space and contamination of the seal area. The use of a coated paper, as in the zinc chloride or Leclanche' systems, helps somewhat in protecting against direct mix penetration of the paper, but if anything the free liquid carrying mix fines is even more of a problem because the film or coating makes the paper less immediately absorptive. Accordingly there is a need for an improved separator construction for primary galvanic cells having a high moisture content.

It is the principal object of this invention to satisfy this need.

More specifically, an object of the invention is the production of a separator for a primary galvanic cell having a depolarizer-cathode containing about 60 to 75 percent by volume of electrolyte.

Figure 2:
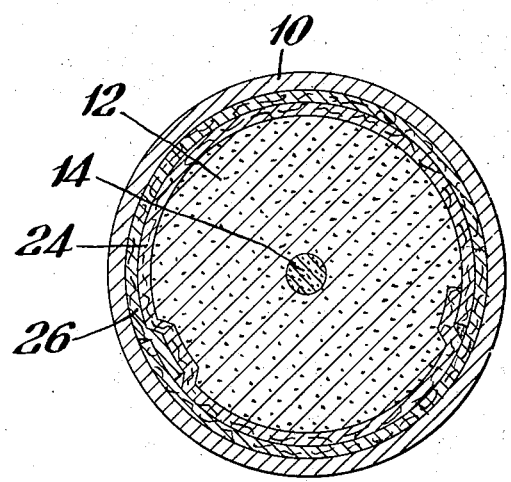

In the accompanying drawing:

FIG. 1 is a vertical section of a primary galvanic cell embodying the invention; and FIG. 2 is a view taken along the line 2—2 of FIG. 1 looking in the direction of the arrows.

In accordance with the invention there is provided in a primary galvanic cell having a consumable anode, a depolarizer-cathode and electrolyte wetting the depolarizer-cathode and constituting about 60 to 75 percent by volume of it, a separator between the anode and the depolarizer-cathode which comprises two plies of electrolyte bibulous paper. One ply of the separator is adjacent to and in contact with the depolarizer-cathode and the other ply is adjacent to and in contact with the anode, both plies being in contact with each other. In the cell of the invention the depolarizer mix is so disposed within the cylindrical anode as to provide a free space between the depolarizer-cathode and a closure for the cell. The paper ply adjacent to the depolarizer-cathode is folded over at that portion thereof which defines one boundary of the free space. The anode-contacting ply of the separator extends into the free space and beyond the folded over portion of the cathode-contacting ply of the separator.

Referring to the drawing, a primary galvanic cell embodying the invention comprises a cylindrical consumable anode 10 which serves as the cell container. Within the container-anode 10 is, a depolarizer-cathode 12 containing electrolyte for the cell. Centrally of the depolarizer cathode 12 is a cathode-collector 14 extending outwardly of the cell. The cell is closed by a vented washer 16 and a metal cover 18 which is secured to an end of the container anode 10. A metal terminal 20 is provided on the cathode collector 14.

The depolarizer-cathode 12, as shown does not completely fill the container-anode 10, so that between the depolarizer-cathode 12 and the washer 16 a free space 22 is provided. Separating the depolarizer-cathode 12 from the walls of the container-anode 10 is the separator of the invention which, as shown, comprises two plies 24, 26 of paper. A paper cup 28 separates the depolarizer-cathode 12 from the bottom of the container-anode 10.

As shown in FIG. 1 the two plies 24, 26 of the separator are, respectively, adjacent to and in contact with the depolarizer-cathode 12 and the container-anode 10 and each other. The anode-contacting ply 26 extends into the free space 22 and its contact with the container-anode continues in that space. The cathode-contacting ply 24 is folded over the depolarizer-cathode 12 in the portion thereof which defines one boundary of the free space 22, the folded over portion of the ply 24 extending substantially to the cathode collector 14, this being the preferred construction. As shown in FIG. 2 each of the plies 24, 26 is a single sheet the ends of which overlap, and the overlapped portion of the ply 24 is spaced away from the overlapped portion of the ply 26.

Suitable materials for the two plies of paper in the separator of the invention include kraft paper. Although both plies may be of the same type of paper, it is preferred that they be somewhat different in properties. The ply in contact with the depolarizer-cathode may be of the type referred to as tube-winding kraft paper which is used to make multiply tubes, such as mailing tubes. Although dense and tough it is wettable by aqueous electrolyte and has good wet-strength. The anode-contacting ply is preferably made of another type of kraft paper referred to familiarly in the industry as "saturating kraft". This paper, which is discussed in "Pulp and Paper Chemistry and Chemical Technology" 2nd Edition (1961) by J. P. Casey and published by Interscience Publishers, Inc. is not so tough as the tube winding paper, being unsized and loosely felted, but is more bibulous or sorptive and therefore is more suitable to use in contact with the anode.

In assembling a cell embodying the separator of this invention, the two plies of paper may be handled separately or together. Although as discussed, the anode-contacting ply of the separator extends beyond the depolarizer-cathode into the free space of the completed cell, actually, it is shorter as measured from the bottom toward the top of the cylindrical container than the inner ply which is in contact with the depolarizer-cathode. This of course is because the depolarizer-cathode-contacting ply must be long enough to reach the top of the container and later to be folded over the mix in the free space.

Whether the two plies of paper are handled singly or as a unit, they are inserted in the cell container preferably so that the overlapping edges of each are displaced from each other. An insulating cup suitably of paper is placed at the bottom of the container, and the depolarizer-cathode mix is placed in the container. A cathode collector is driven into the mix and the mix contacting paper ply is folded over the top of the mix. Alternatively, the paper may be folded over first and the cathode collector then driven into the mix. The paper must have good wet strength to prevent tearing. The cell is then closed.

The separator of the invention has been used in a large number of magnesium cells, and tests of such cells have indicated that it possesses substantial advantages over the single ply separator which has been used as the standard construction for cells of this type. Thus, mix smearing of the inner walls of the magnesium anode has been virtually eliminated in cells utilizing the separator of the invention. Moreover, the use of a more bibulous ply in extended contact with the anode has led to increased and more efficient utilization of magnesium.

In one specification for magnesium cells, cells stored for 160°F. for 1 month are required to give 15 hours continuous service to a cut-off voltage of 1.25 on a repetitive cyclical discharge through 1.2 ohms for 2 minutes followed by discharge through 47.5 ohms for 18 minutes. Cells made with a conventional single paper separator consistently failed this test, but cells embodying the separator of the invention met the requirement and gave over 90 percent of the service given by cells not subjected to these extreme conditions but tested shortly after manufacture.

In a series of tests of magnesium cells using the separator of the invention a number of cells were made in which the cathode-contacting ply was of tube-winding kraft paper 0.0045 inch thick and the anode contacting ply was of saturating kraft paper 0.0035 inch thick. The mix contained by weight about 53 percent manganese dioxide and 38 percent of 4N magnesium perchlorate electrolyte. The electrolyte constituted about 66 percent by volume of the mix. Also present in the mix were acetylene black (about 6 percent) barium chromate (about 2 percent) and magnesium hydroxide (about 1 percent). Another group of cells with the same electrolyte and the same mix composition was made with a conventional single ply separator of tube-winding kraft paper 0.0045 inch thick. In other respects the two groups of cells were made nearly identical as possible under factory conditions to afford a direct comparison of the separator of the invention with the conventional separator.

In the first of the tests, cells from each group were opened 14 days after they had been made, having been stored at room temperature. Observation to the naked eye showed the double separator cell anode walls to be much cleaner than those of the single separator cells without sign of corrosion. Examination of the separator papers showed that mix fines had penetrated the inner separator but had then become entrapped at the interface between the separators. No mix penetrated the outer separator to reach the anode surface.

In another series of tests, the delay characteristics of the cells were determined on 14 day old cells. As is well known, a characteristic of magnesium cells is that when placed upon load they do not immediately deliver their rated voltage but there is a delayed voltage build-up. This is because of formation of a passive film on the anode. A test for delay is to determine either the time in seconds the cells require to give a specified voltage, on a given load for example 10 ohms, or to determine the voltage on a given load after a specified time. In the second type of test, it was observed that after 1.5 seconds the voltage of cells with the single separator averaged 1.79 whereas after the same period the average voltage of cells containing the separator of the invention was 1.72. Thus, although this voltage was somewhat lower, the indication is that the separator of the invention does not seriously increase the early delay characteristic in magnesium cells.

The shorter delay in the single separator cells upon later examination was found to be due to initial stages of corrosion probably caused by deposit of mix on the magnesium wall. Thus, a short delay characteristic in a freshly made cell may be an indication of early and undesirable corrosion, whereas a longer delay on a freshly made cell is an indication that undesirable shelf corrosion is at a minimum, and the passive, protective film has formed on the anode surface.

Cells of the above trial were aged 1 week at a temperature of 160°F., then cooled to 75°F. and the 10 ohm delay test repeated. The cells with the separator of the invention showed little change, whereas the starting delay of the single separator cells had become longer and the average voltage at 1.5 seconds on load was lower. The average voltage of the cells with the single separator was 1.68 volts, whereas the average voltage of the cells with the double separator of the invention was 1.70 volts. These results indicate that magnesium corrosion of the cells with the single separator continued under the high temperature storage and increased the starting delay. The small change in voltage of the cells with the double separator indicates little anode corrosion.

In another series of tests of the double separator cells in comparison with the single separator cells, four lots of cells were prepared, all using the mix and electrolyte above described. Two lots contained 49 grams of mix per cell and two lots contained 42 grams of mix per cell. The former lots were discharged at a repetitive cyclic discharge of 2.4 ohms for 2 minutes followed by 72.5 ohms for 18 minutes. The latter lots were subjected to a similar repetitive discharge of 3.55 ohms for 2 minutes followed by 72.75 ohms for 18 minutes. In each test, one lot of cells had the double separator of the invention and one lot had a single separator. In each case the double separator cell had a longer service life to 1.28 volt than the single separator cell. In each case the minimum increase in service life was not less than 3 percent. The maximum increase was 8 percent.

From the foregoing data it will be seen that in addition to reducing the number of imperfect cells the separator of the invention is beneficial to performance characteristics of magnesium cells. The benefits provided by the separator are not limited to cells with magnesium anodes, however, but are attainable in other cell systems characterized by employing a high moisture content depolarizer-cathode. As above stated such a system is that employing a zinc anode and a zinc chloride electrolyte. Even the Leclanche' cell can benefit if the mix employed is wet enough to give trouble with mix smearing and/or mix penetration. The usual film or coating may be interposed between the outer paper separator and the zinc can wall without in any way negating the advantages of the double paper separator.

What is claimed is:

1. A primary galvanic cell having a cylindrical consumable anode; a depolarizer-cathode within said anode; an electrolyte wetting said depolarizer-cathode; a current collector embedded in said depolarizer-cathode; a closure for said cell; said electrolyte constituting about 60 to 75 percent by volume of said depolarizer-cathode, said depolarizer-cathode being so disposed in said cylindrical anode as to provide a free space between said depolarizer-cathode and said closure; and an improved separator situated between said anode and said depolarizer-cathode, said separator consisting of two plies of electrolyte-bibulous paper, a first ply thereof being adjacent to and in contact with said depolarizer-cathode and a second ply thereof being in contact with said container-anode including a portion of said anode in said free space, said first and second plies being in contact with each other except in said free space, said first ply being at least as long as the vertical wall of said cylindrical container and having a portion folded over the portion of said depolarizer-cathode defining one boundary of said free space.

2. A primary cell as defined by claim 1 in which said second ply of said separator is more sorptive of electrolyte than said first ply.

3. A primary cell as defined by claim 1, in which both plies of said separator are kraft paper.

4. A primary galvanic cell as defined by claim 1, in which said anode is magnesium.

5. A primary galvanic cell as defined by claim 3 in which said paper ply in contact with said depolarizer-cathode is tube-winding kraft paper.

6. A primary galvanic cell as defined by claim 3 in which said paper ply in contact with said depolarizer-cathode is tube-winding kraft paper and said ply in contact with said anode is saturating kraft paper.

7. A primary galvanic cell as defined by claim 6 in which said anode is magnesium.

* * * * *